United States Patent
Coffman et al.

(10) Patent No.: US 8,930,238 B2
(45) Date of Patent: Jan. 6, 2015

(54) PERVASIVE SYMBIOTIC ADVERTISING SYSTEM AND METHODS THEREFOR

(75) Inventors: Daniel M. Coffman, Bethel, CT (US); Herbert S. McFaddin, Yorktown Heights, NY (US); Chandrasekhar Narayanaswami, Wilton, CT (US); Danny Soroker, Larchmont, NY (US)

(73) Assignee: International Business Machines Corporation, Armonk, NY (US)

( * ) Notice: Subject to any disclaimer, the term of this patent is extended or adjusted under 35 U.S.C. 154(b) by 1417 days.

(21) Appl. No.: 12/034,700

(22) Filed: Feb. 21, 2008

(65) Prior Publication Data

US 2009/0216606 A1    Aug. 27, 2009

(51) Int. Cl.
*G06Q 30/00*     (2012.01)

(52) U.S. Cl.
USPC ................ 705/14.58; 705/14.67

(58) Field of Classification Search
CPC ............. G06Q 30/0261; G06Q 30/02
USPC .......... 705/14.57, 14.58, 14.64, 14.65, 14.66, 705/14.67
See application file for complete search history.

(56) References Cited

U.S. PATENT DOCUMENTS

| | | | |
|---|---|---|---|
| 6,647,269 B2 * | 11/2003 | Hendrey et al. | 455/456.3 |
| 2002/0052781 A1 * | 5/2002 | Aufricht et al. | 705/14 |
| 2006/0036493 A1 * | 2/2006 | Aufricht et al. | 705/14 |
| 2006/0036494 A1 * | 2/2006 | Aufricht et al. | 705/14 |
| 2006/0036495 A1 * | 2/2006 | Aufricht et al. | 705/14 |
| 2006/0259365 A1 * | 11/2006 | Agarwal et al. | 705/14 |
| 2008/0262929 A1 * | 10/2008 | Behr | 705/14 |
| 2008/0288354 A1 * | 11/2008 | Flinn et al. | 705/14 |
| 2009/0076912 A1 * | 3/2009 | Rajan et al. | 705/14 |

FOREIGN PATENT DOCUMENTS

| | | | |
|---|---|---|---|
| JP | 2008-3982 A | 1/2008 | |
| JP | 2008-5223 A | 1/2008 | |

* cited by examiner

*Primary Examiner* — Lindsay M. Maguire
(74) *Attorney, Agent, or Firm* — William J. Stock, Esq.; McGinn IP Law Group, PLLC

(57) ABSTRACT

An advertising system and methods, including an ad service that one of generates, presents and receives information pertaining to an ad presentation, an ad presentation output device that outputs the ad presentation at a presentation location, a user response receiver at the ad service that receives a user response transmitted from a mobile device based on the ad presentation at the presentation location, an ad service transmitter that transmits an executable object to a target device specified in the user response, wherein the target device includes a memory and a processor for executing the executable object to provide a service to the user on the target device, wherein the service is modified based on information one of accessed and determined by the executable object on the target device.

27 Claims, 12 Drawing Sheets

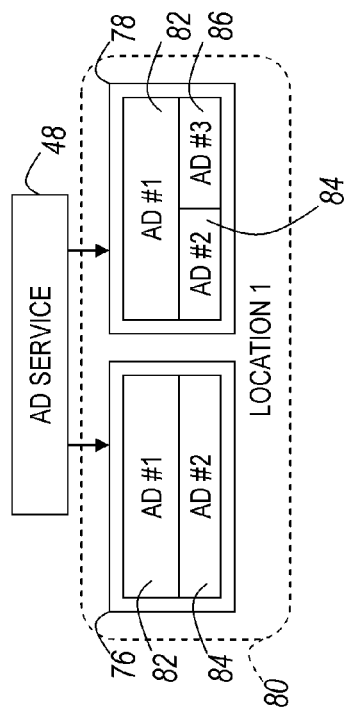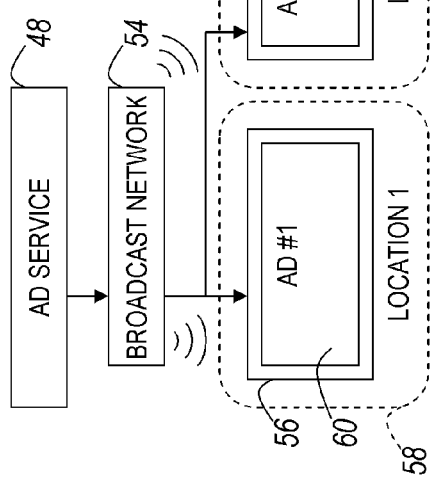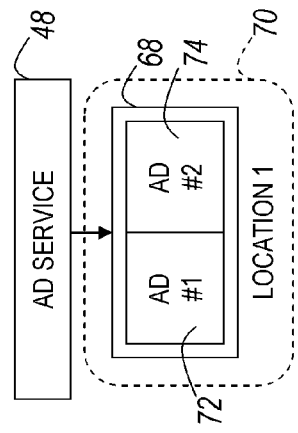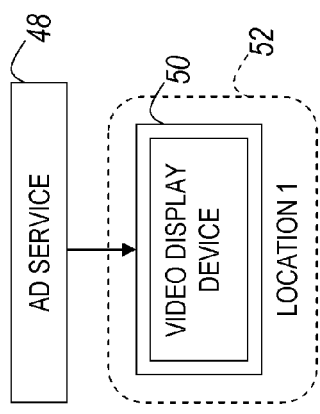

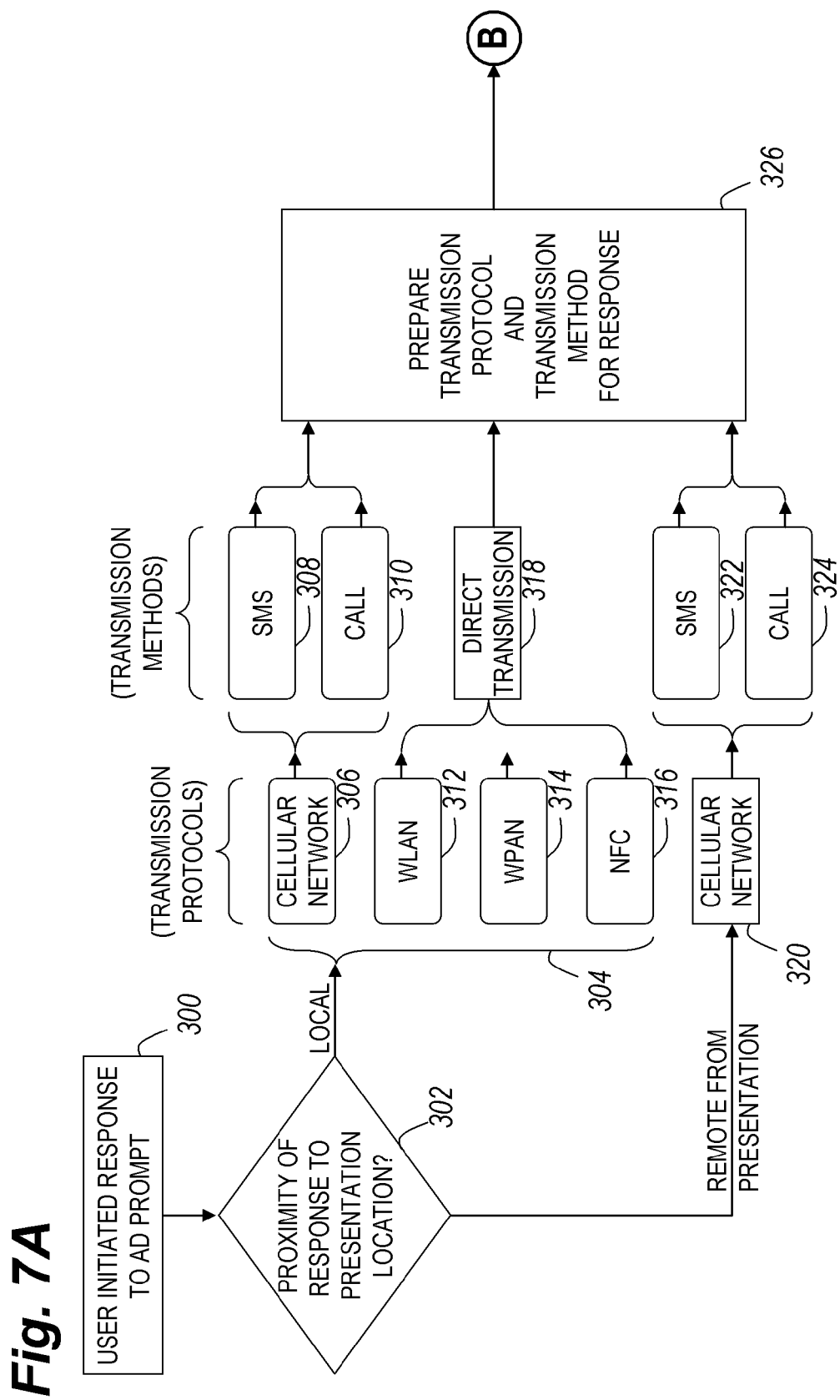

PERVASIVE SYMBIOTIC ADVERTISING SYSTEM AND METHODS THEREFOR

BACKGROUND OF THE INVENTION

1. Field of the Invention

The present invention generally relates to a system and method where ads output on public graphical displays and audio output systems are symbiotically linked to user mobile devices (cell phones or locally networked devices such as the Ipod™ Touch™, etc.) so users in many locations may see advertising on the large display or hear broadcast advertising and react to it using their mobile devices. Each users' reaction, though received from many different locations, causes the transmission of an executable object to a specific target device where the executable object becomes a service on the target device that may be modified by information related to the target device.

2. Description of the Related Art

The world of advertising has undergone massive changes over the last number of years and a sizeable fraction of advertising business has moved from print and television to the web. Following this trend, advertisers are now also targeting cellular phones and other mobile communication devices.

Large LCD displays are proliferating in various public spaces such as malls, train stations, fitness centers, etc., due to technological advances and rapidly declining costs. These displays are typically used for showing pertinent information such as schedules, and entertainment, or for advertisements. However, ads shown on such displays do not allow a user to take immediate action. This leads to lost revenue for the advertisers.

SUMMARY OF THE INVENTION

In view of the foregoing and other exemplary problems, drawbacks, and disadvantages of the conventional methods and structures, a purpose of the exemplary aspects of the present invention is to provide a system and method for moving ad components from one device to another, storing the ad, and having the ad be modified into other forms in a way that is customized to the user and the environment where the ad is hosted.

Ads delivered to personal mobile devices may be customized for the user by utilizing information about user preference, history, and perhaps intent, and are likely to have higher hit rates and associated revenue. Such ads delivered directly to personal mobile devices also allow users to act on these ads, for example, to connect to a business process so as to buy the advertised item or locate a store that sells the item.

An exemplary aspect of the present invention includes an advertising system and methods, including an ad service that either generates, presents or receives information pertaining to an ad presentation, an ad presentation output device that outputs the ad presentation at a presentation location, a user response receiver at the ad service that receives a user response transmitted from a mobile device based on the ad presentation at the presentation location, an ad service transmitter that transmits an executable object to a target device specified in the user response, wherein the target device includes a memory and a processor for executing the executable object to provide a service to the user on the target device, wherein the service is modified based on information either accessed or determined by the executable object on the target device.

In another exemplary aspect of the present invention, the ad presentation output device is either a video output device or an audio output device.

In another exemplary aspect of the present invention, the ad presentation includes an ad presentation ID that the user includes in the user response.

In another exemplary aspect of the present invention, the ad presentation ID code is wirelessly transmitted via an ad presentation ID transmitter to the mobile device and includes either an ID code or an ad graphic that identifies a specific ad presentation to the user on the mobile device.

In another exemplary aspect of the present invention, the user response is transmitted to the ad service remote from the presentation location.

In another exemplary aspect of the present invention, the user response is transmitted to the ad service at the presentation location by either a wireless local area network protocol, a wireless personal area network protocol, or a near field communication protocol.

In another exemplary aspect of the present invention, the user response is transmitted to the ad service via a cellular communication network in either a telephone call or a short message service (SMS).

In another exemplary aspect of the present invention, the target device is either the mobile device, another mobile device or a computer connected to a network.

In another exemplary aspect of the present invention, the executable object either modifies or provides the service on the target device based on at least either user profile information either stored on the target device or transmitted in the response by the mobile device, user profile information either stored in a remote location or retrieved from the remote location by said ad service based on information either stored in the mobile device or transmitted in the response by said mobile device, user input on the target device given in response to executing the executable object, either hardware or software capabilities of the target device, external hardware connected to the target device, an external device registered for communication with the target device, a status of communication of the external device with the target device, or a determined location of the target device.

In another exemplary aspect of the present invention, wherein the service further includes a coupon to be used in purchasing either goods or services, an executable program, either a location finding or a direction providing service; and connection to and use of a data providing service.

In another exemplary aspect of the present invention, the method including generating an ad presentation, outputting the ad presentation at at least one ad presentation output device at a presentation location, prompting a user for a response on a mobile device to the ad presentation at the presentation location, receiving a user response from the mobile device based on prompting the user at the presentation location, generating an executable object based on the received user response, transmitting the executable object to a target device specified in the user response, receiving the executable object on the target device, and executing the received executable object to provide a service to the user on the target device.

In another exemplary aspect of the present invention, further including modifying the provided service on the target device based on at least either retrieving user profile information either stored on the target device or transmitted in the response by the mobile device, retrieving user profile information stored in a remote location based on information either stored in said mobile device or transmitted in the response by the mobile device receiving user input on the target device in response to executing the executable object, determining either hardware or software capabilities of the target device, determining external hardware connected to the target device, determining an external device registered for communication with the target device, determining a status of communication of the external device with the target device, or determining a location of the target device.

In another exemplary aspect of the present invention, further including, transmitting the modified service from the target device to either another mobile device or a networked computing device.

In another exemplary aspect of the present invention, the outputting the ad presentation includes outputting on either a video output device or an audio output device.

In another exemplary aspect of the present invention, the outputting the ad presentation includes outputting either a single ad presentation on a plurality of ad presentation output devices, a plurality of simultaneous ad presentations on a single ad presentation output device, a user specific ad presentation based on user profile information transmitted from the mobile device, or an ad presentation ID that identifies a specific ad presentation.

In another exemplary aspect of the present invention, the receiving the user response further includes receiving the response via at least either a cellular communication network, a wireless local area network protocol, a wireless personal area network protocol, or a near field communication protocol.

In another exemplary aspect of the present invention, the provided service further includes outputting a coupon to be used in the purchase of goods or services, providing an executable program, providing either a location finding or a direction providing service on the target device, and connecting to and use of a data providing service.

In another exemplary aspect of the present invention, further including transmitting the provided service from the target device to either another mobile device or a networked computing device.

In another exemplary aspect of the present invention, a method including generating and outputting an ad presentation at a presentation location on an ad presentation output device, receiving a response from a mobile device based on the ad presentation at the presentation location, generating and transmitting an executable object to a target device specified in the response providing a service to a user on the target device by executing the executable object on a processor at the target device, and wherein the service provided to the user is provided based on at least either data in the target device, input received on the target device, a hardware configuration of the target device, a software configuration of the target device, a communication device registered with and a status of communication with the target device, or a determined location of the target device.

In another exemplary aspect of the present invention, further including receiving ad transaction data when a transaction is made by a user for either goods or services as a result of the provided service.

With its unique and novel features, the present invention provides a method and system for receiving responses from user mobile devices based on an ad prompting the user to do so, wherein an ad service generates an executable object for transmission to a target device to deliver a service that may be modified further based on user information. This invention allows users of mobile devices to request the transmission of useful services based on the presentation of advertising.

BRIEF DESCRIPTION OF THE DRAWINGS

The foregoing and other exemplary purposes, aspects and advantages will be better understood from the following detailed description of an exemplary embodiment of the invention with reference to the drawings, in which:

FIG. 2A illustrates an exemplary embodiment of the pervasive symbiotic advertising system, according to a first exemplary aspect of a video ad presentation of the present invention;

FIG. 2B illustrates an exemplary embodiment of the pervasive symbiotic advertising system, according to a second exemplary aspect of a video ad presentation of the present invention;

FIG. 2C illustrates an exemplary embodiment of the pervasive symbiotic advertising system, according to a third exemplary aspect of a video ad presentation of the present invention;

FIG. 2D illustrates an exemplary embodiment of the pervasive symbiotic advertising system, according to a fourth exemplary aspect of a video ad presentation of the present invention;

FIG. 7A illustrates a logic flowchart of the pervasive symbiotic advertising system, according to an exemplary aspect of the user initiated response to an ad prompt by the ad service of the present invention;

DETAILED DESCRIPTION OF EXEMPLARY EMBODIMENTS OF THE INVENTION

Figure 1:
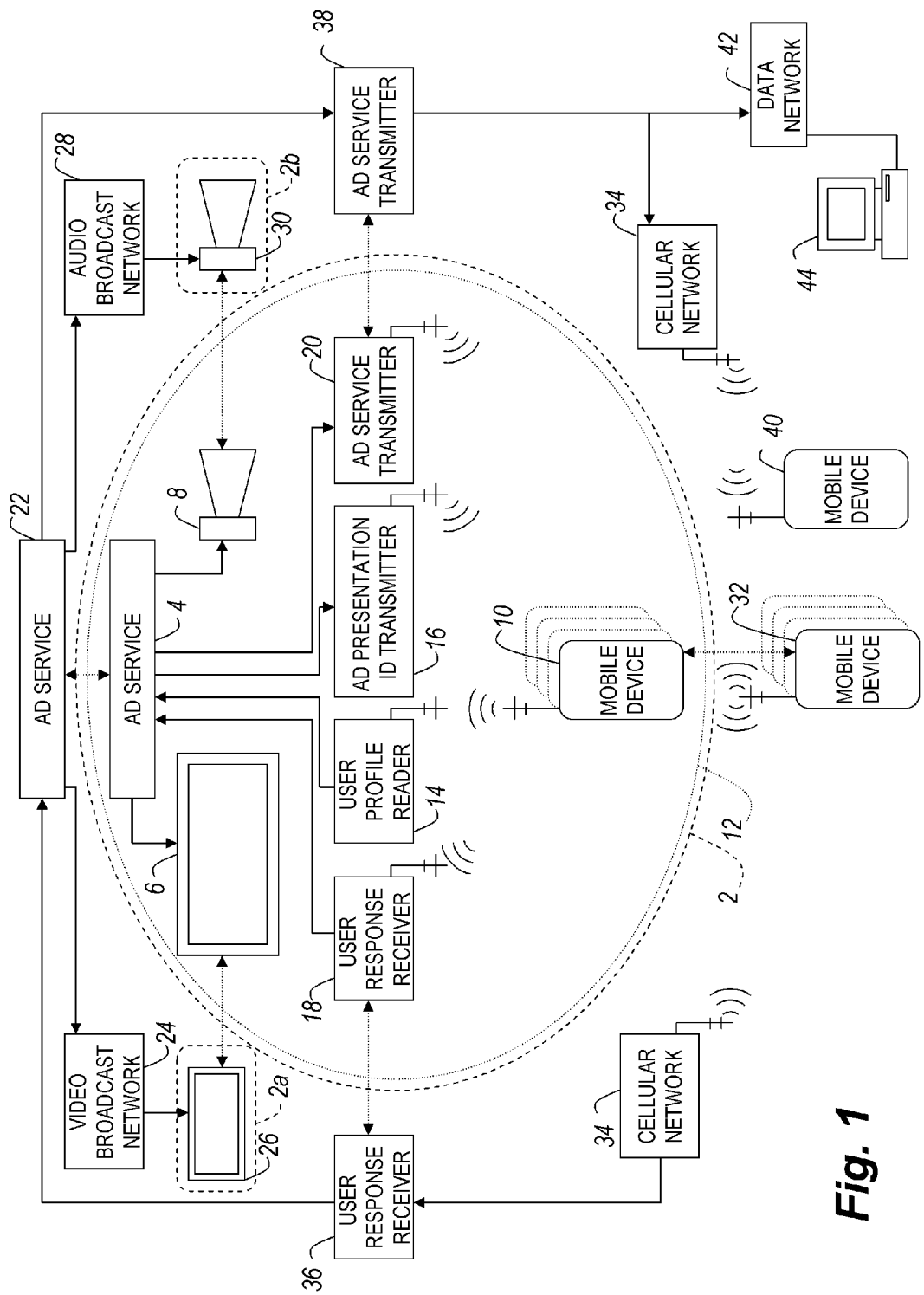
FIG. 1 illustrates an exemplary embodiment of the pervasive symbiotic advertising system, according to an exemplary aspect of an ad presentation system of the present invention.

In this disclosure, an advertisement is a piece of data that has computational significance, rather than a piece of content that is simply "viewed". This defined advertisement has particular value in scenarios involving mobile devices, which may act as secure repositories of advertisements that are customized to the owner of the device. In these scenarios, advertisements may be generated from elements in the device's surroundings, either at the explicit volition of the user, or automatically, by agents on the device that act on behalf of the user.

Generally, the user may point his mobile device at a display and retrieve service information from the display or enter a code shown on the display to invoke the service. The service may be in the form of a URL that could be sent directly by the display or by a proxy in the network. For example, in addition to showing the ad on the display, the display could broadcast radio signals that encode the location for the service. The user's device could read the radio signal based on user initiation (or automatically) and connect to the service. The preferred way to connect will be through a browser and web-based technology. In another way, the user could pass his device near the display and receive information about the service.

Generally, as advertisements travel from one device to another, they undergo transformations which customize them to the particular needs of the user or the capabilities of the receiving device. This gives the perception of the ad "morphing" from one form to another.

For example, an ad on a display may be converted to a usable service on the user's mobile device based on some interaction with the display or back end. So what started out as an ad on the public display turned into a service that could be customized to the user. There are a variety of resulting forms that ad may be transformed into.

Another example might be where an ad is transformed into a coupon datum which describes specific terms and time frames in which the purchase of an advertised product results in a price discount. An ad might also be transformed into a direction finding service that assists the user in finding locations or sources for the advertised product.

Other uses of this transformation methodology might culminate in the acquisition of the product itself—i.e., the product itself lies at the end of a chain of transformations. This would have particular usage in the case of advertisements for software and media products. Intermediate forms of the ad might provide down level or limited function versions of the product, which further transformations could replace with the full version. Each stage of such transformation chains might be accompanied by financial incentives or rewards, which may flow in both directions.

For example, early in a chain of transformations the advertiser may provide incentives to the customer which motivates the customer to receive the ad on their device. In the later stages, after the customer has been sufficiently convinced of the worth of the advertised item (i.e., has been "sold" on the product), further transformations represent upgrades that have value to the customer, and the incentives would flow to the advertiser, ultimately representing payment for the product.

The ad and service happen on different devices as opposed to what happens when a web ad is selected. In addition, the ad may morph itself into as many services as users who "click" on the ad, there is a one to many relationship based on the "click". That is, the service may be customized based on information in the user's mobile device. Such information may include user's age, sex, home address, preferences, address book, current location, past relationship with the business, etc.

Referring now to FIGS. 1A-8B, there are shown exemplary embodiments of the method and structures of the present invention.

FIG. 1 generally illustrates the advertising system of the present invention.

The dotted line indicated by reference numbers 2, 2a and 2b identify presentation locations wherein an ad presentation is output on a specific ad presentation output device and is controlled in accordance with an ad service 4. The ad service 4 controls the generation and presentation of the ad presentation on ad presentation output devices 6 and 8, and subsequently receives information pertaining to user's responses and purchases made based on the original output of the ad presentation.

The ad presentation is output on an ad presentation output device that may include either a video output display 6 or an audio output device 8.

FIGS. 2A-2D illustrate exemplary embodiments according to a video ad presentation of the present invention wherein the ad presentation output device includes a video graphics monitor display or television.

FIG. 2A illustrates an exemplary embodiment wherein ad service 48 causes an ad presentation to be displayed at a video display device 50 at a first location 52. This singular presentation location may include a video display device being located remotely from a location where the goods or services advertised in the ad presentation are being sold. One example might be a kiosk located in a pedestrian area where users with mobile devices will see the ad presentation.

FIG. 2B illustrates an exemplary embodiment wherein the ad service 48 causes an ad presentation to be first broadcast, (through either wired or wireless transmission means), by a broadcast network 54 to a plurality of ad presentation output devices in different locations. For example, a first graphical output device 56 located at a first location 58 may display and a first ad presentation 60. Contemporaneous with the display of the ad presentation 60, a graphical display 62 may receive either the same or a different ad presentation 66 at a second and separate location 64. This feature of the present invention allows for simultaneous output of single or multiple ad presentations at a plurality of presentation locations on multiple ad presentation output devices through either broadcast or cablecast television programming or other network programming distribution systems.

FIG. 2C illustrates an exemplary embodiment where the ad service 48 enables the output of more than one ad presentation at a single at presentation output device. Video graphic display 68 includes a first ad presentation 72 and a second ad presentation 74 being displayed simultaneously at the presentation location 70. This feature of the present invention allows for the use of a single ad presentation video output device to simultaneously display more than one ad presentation increasing the efficiency of the ad presentation output devices.

FIG. 2D illustrates an exemplary embodiment of the present invention similar to FIG. 2C move but with more than one ad presentation video output device. Here, ad service 48 enables the output and a first video graphic display 76 at a single presentation location 80 to display a first ad presentation 82 simultaneously with the second ad presentation 84. A second video graphic display 78 at a second presentation location 64 displays the first ad presentation 82, the second ad presentation 84 (which are both displayed at the first video graphic display 76), and a third ad presentation 86. This feature of the present invention allows for complex ad presentations on multiple ad presentation output devices optimizing the use of the ad presentation output hardware at a single presentation location.

Figure 3B:
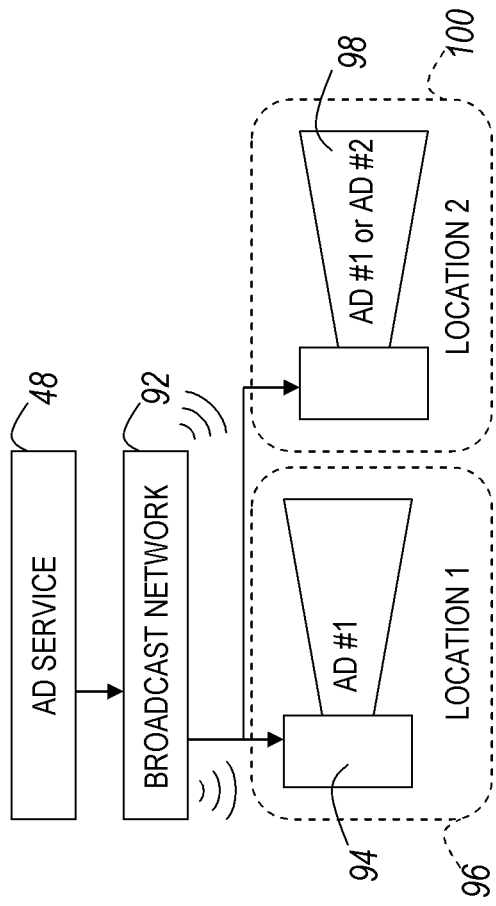
FIG. 3B illustrates an exemplary embodiment of the pervasive symbiotic advertising system, according to a second exemplary aspect of an audio ad presentation of the present invention.
Figure 3A:
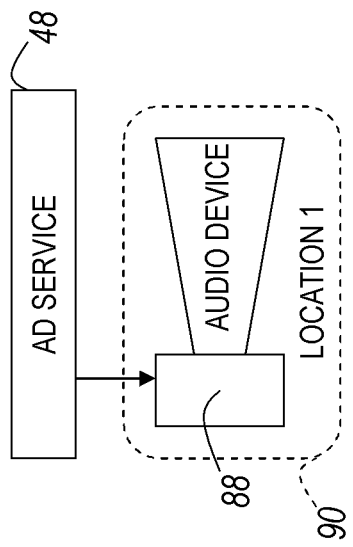
FIG. 3A illustrates an exemplary embodiment of the pervasive symbiotic advertising system, according to a first exemplary aspect of an audio ad presentation of the present invention.

FIGS. 3A-3B illustrate exemplary embodiments according to an audio ad presentation of the present invention, wherein the ad presentation output device includes an audio speaker.

FIG. 3A illustrates the most basic form of this exemplary embodiment where an ad service 48 enables the audio output of an audio ad presentation to an audio device 88 at a single location 90. For example, an audio output through speaker proximate a print advertisement in a public area where it would be inappropriate for a video output device to display an ad presentation due to weather or security reasons.

FIG. 3B illustrates an exemplary embodiment wherein ad service 48 transfers an ad presentation to an audio broadcast network 92 for broadcast, via a network or wirelessly, to a first audio device 94 at a first location 96, and to a second audio device 98 at a second location 100. Similar to the video graphic ad presentation of FIG. 2B described above, the first and second audio devices 94 and 98 may output the same ad presentation simultaneously, or may output an ad presentation unique to each audio device and presentation location. The broadcast audio for both of these embodiments may be transmitted via traditional terrestrial radio, satellite radio, streaming internet radio, through previously recorded Internet podcasts, or transmitted independently by discrete audio files.

Ad Presentation Content

The ad service 4 generates an ad presentation to advertise products, services, or incentives to purchase products or services. In a most basic embodiment, the ad presentation may be generated by the ad service 4 independent of any information with respect to an intended recipient of the ad presentation.

However, the present invention may also generate an ad presentation based on user information collected from a user before the ad presentation is generated for presentation. This feature of the present invention is accomplished by the ad service 4 querying a user's mobile device 10 and receiving user profile information stored within the user's mobile device 10 via a user profile reader 14. In order for this communication to take place, the presentation location 2 must include a wireless communication zone 12 for the ad service 4 and the mobile device 10 to communicate.

An exemplary embodiment of this feature of the present invention may include the ability of the ad service 4 to detect when a mobile device 10 is within both the presentation location 2 and the wireless communication zone 12 and to query the mobile device to transmit a portion of the mobile device's user profile information to the ad service 4. Thereafter, the ad service 4 may generate and display an ad presentation based on the specific user profile information of the user with a mobile device 10. This process may take place automatically if the user sets their mobile device 10 to freely allow all or selected portions of their user profile information to be accessed and retrieved. However, the mobile device 10 may restrict all or selected portions of user profile information to be transmitted to the ad service 4 for privacy purposes.

Additionally, the present invention may generate an ad presentation based on general information not specific to any user information before the ad presentation is generated for presentation. This information may be generally determined and independent of any user profile information on the user mobile communication device, for example, the time of day, the presentation location, the location where the user's mobile device is detected relative to the presentation location, external parameters relative to the presentation location, etc.

For example, if the ad service determines that it is either raining or it is forecasted to rain at a specific ad presentation location, where the weather is determined as the external parameter, then the ad service may generate an ad presentation for a vendor that sells umbrellas and/or presents a coupon to be used for the purchase of an umbrella at that vendor.

The content of the ad presentation, whether in video or audio format, is similar to traditional video and audio advertising with the exception of an ad prompt included in the ad presentation.

Figure 4A:
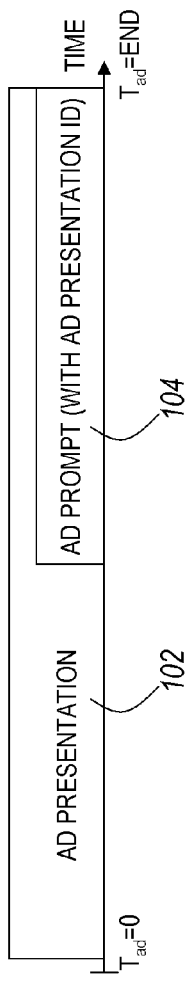
FIG. 4A illustrates an exemplary embodiment of the pervasive symbiotic advertising system, according to a first exemplary aspect of an ad presentation of the present invention.
Figure 4B:
FIG. 4B illustrates an exemplary embodiment of the pervasive symbiotic advertising system, according to a second exemplary aspect of an ad presentation of the present invention.

FIGS. 4A-4B illustrate exemplary embodiments according to the structures of an ad presentation including an ad prompt of the present invention.

FIG. 4A illustrates an exemplary embodiment of the invention where an ad presentation 102 beginning at time $T_{ad}=0$ and ending at $T_{ad}=END$ contains an ad prompt 104 that occurs after the beginning of the ad presentation where $T_{ad}=0$. This format of the ad prompt is most common in both audio and video ad presentations where a prompt for a user to respond is usually placed after the beginning but before the end of the ad presentation.

FIG. 4B illustrates a second exemplary embodiment of the invention wherein ad presentation 102 beginning at time $T_{ad}=0$ and ending at $T_{ad}=END$ contains an ad prompt 106 that occurs simultaneously and sequentially with the entire ad presentation 102. This format of the ad prompt may be a "ticker" type format where the ad prompt information is overlaid on a video display at the same time of the ad presentation. An example of this format typically occurs when cable television shopping networks display information on the bottom or the side of the video display that gives viewers purchase information during the entire length of the commercial.

The ad prompt may also include information on how a user may specifically respond to the ad prompt. This information may include specific details on what response procedure may be used when a user transmits a response on a certain wireless protocol, what user identification may be transmitted to the at service, how the ad presentation may be identified that the user is responding to on his mobile device, and what target device a service is transmitted to, if different that the user's mobile device.

The ad prompt typically will also include information regarding an ad presentation ID code that specifically identifies the ad presentation at a given time and presentation location 2. This ad presentation ID code may be identified by the user of the mobile device 10 and transmitted back to the ad servers 4 via a user response receiver 18. The ad presentation ID code may be used by the ad service to determine what particular ad presentation was responded to, where the particular presentation location was, and what presentation output device or devices were used to solicit the user response.

The ad presentation ID may be a "static" type identification code that identifies only a specific presentation location and/or an ad presentation output device. An example of this type of static identification code is when a single ad presentation is being displayed on an ad presentation output device having only a single presentation location. No other information is need to specifically identify the ad presentation give these parameters.

However, the ad presentation ID may be a "dynamic" type identification code that identifies a specific ad presentation at a specific ad presentation location on a specific ad presentation output device.

Either the static or dynamic type identification codes may be a combination of numbers and/or characters, or may be a graphic, for example, a graphic thumbnail file associated with the goods and services in the ad presentation, or a trademark of the source of those goods and services.

The ad presentation ID may be output either audibly, output on a video display device or may be output via an ad presentation ID transmitter 16 such that a user on a mobile device 10 may select from a list of ad presentation IDs or confirm an ad presentation ID on their mobile device 10 without having to input a lengthy or complicated ad presentation ID code. The ad presentation ID transmitter 16 communicates within the wireless communication zone 12 with known communication protocols herein described below.

With respect to the relationship between the ad service 4 and the ad targeted user with mobile communication device 10, when the ad service 4 generates an ad presentation based on specific user profile information, the ad service has a "One-to-One" relationship. However when the ad service 4 generates an ad presentation without specific user profile information, the ad service 4 has a "One-to-Many" relationship. This "One-to-Many" relationship, illustrated in FIG. 1 by the outlined stacked mobile devices behind mobile device 10, and similarly mobile device 32, (as described later), enables the ad service 4 to receive responses from multiple users of mobile devices to either a single ad presentation, or multiple ad presentations.

Figure 5:
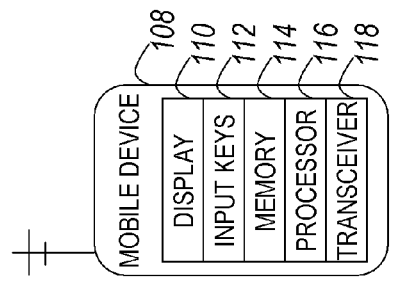
FIG. 5 illustrates an exemplary embodiment of the pervasive symbiotic advertising system, according to an exemplary aspect of an a mobile communication device of the present invention.

FIG. 5 illustrates a typical mobile communication device 108 including a display portion 110, input keys 112, in memory 114, a processor 116 and a communication transceiver 118. The communication transceiver 118 may communicate on a cellular, wireless local or wireless personal area protocols, or near field communication protocols, as described below.

User Response on Mobile Communication Device

Referring back to FIG. 1, the user may respond to an ad presentation within the wireless communication zone 12 on the mobile device 10 via a user response receiver 18. However, the user may have a mobile device outside of the wireless communication zone 12, or may have removed himself with his mobile device from the original presentation location 2 including the wireless communication zone 12. Reference number 32 designates a mobile device having such characteristics although it is identical to the mobile device 10 within the wireless communication zone 12.

When the mobile device 32 is outside of the wireless communication zone 12, cellular network 34 receives the user response and transmits the user response to a user response receiver 36 connected to the ad service 22. Reference number 36 designates the user response receiver being outside of the wireless communication zone 12 although it is identical to the user response receiver 18 within the wireless communication zone 12. Likewise, reference number 22 designates an ad service being outside of the wireless communication zone 12 although it is identical to the ad service 4 within the wireless communication zoned 12.

In an alternative embodiment, ad service 22 transmits an ad presentation to a video broadcast network 24 for presentation on an ad presentation video output device 26 at another presentation location 2a outside of the wireless communication zone 12. Video output device 26 is identical to video output device 6 except it is outside the wireless communication zone 12. The likewise, ad service 22 transmits an ad presentation to an audio broadcast network 28 for presentation on an ad presentation audio output device 30 at another presentation location 2b outside of the wireless communication zone 12. Audio output device 30 is identical to audio output device 8 except it is outside the wireless communication zone 12.

This configuration of these exemplary embodiments of the present invention will allow for a user to respond to an ad presentation at both the different location or a different time than the original ad presentation location and time.

Both mobile devices 10 and 32 may communicate a user response via the cellular network 34 to the ad service 4 or 22 on cellular network standards such as frequency division multiple access (FDMA), code division multiple access (CDMA) or time division multiple access (TDMA).

Mobile device 10 within the wireless communication zone 12 may additionally communicate to the ad service 4 via communication protocols including wireless local area network (WLAN), (for example, WiFi (802.11), wireless USB and equivalents), wireless personal area network (WPAN), (for example Bluetooth, IrDA, UWB, ZigBee and equivalents), and/or near field communication (NFC), (for example, RFID or ISO 14443 compliant and equivalents). Any one or combination of these protocols may be used in communication with the ad service 4.

Content of User Response

If the selected user response transmission protocol uses a cellular network, the user response may include a normal cell call to a cell number designated by the ad service 4 or 22. Additionally, short message service (SMS) may be used to text message a number identified by the ad prompt. If the mobile device 10 is within the wireless communication zone 12, the mobile device 10 may communicate directly with the user response receiver 18 via the WLAN, WPAN, or NFC methods described above to transmit the user response directly to the ad service 4. Additionally, the user response receiver 18 and the user profile reader 14 may be the same device using the same wireless transmission protocols.

FIG. 7A illustrates generating a user initiated response to an ad prompt (300). Next, depending on the proximity of the user response to the presentation location 2, (or the wireless communication zone 12), (302), if the user's mobile device 10 is locally situated, then a choice of transmission protocols (304) may be used. If the user response is made on a cellular network (306), then either the transmission method of an SMS text message, (308), or a telephone call (310) may be made. If the user response is made on a wireless network or near field communication basis, then either a WLAN (312), a WPAN (314) or a NFC (316) is used as a direct transmission (318) to the ad service.

If the user response is remote from the presentation location and the wireless communication zoned 12, a cellular network (320) may be used to transmit either an SMS text message (322) or a direct dial phone call (324) for communication.

The mobile device after determining which transmission protocol and transmission method is to be used prepares the protocol and method of for transmitting the user response (326).

The user ID is also transmitted in the user response by either the mobile device 10 or 32 so that the ad service 4 or 22 can record and identify each particular mobile device response within the advertising system. A first exemplary embodiment of transmitting a user ID includes transmitting the mobile device telephone number, typically identified in the subscriber identity module (SIM) card of a cell phone device a cellular telephone call or the SMS text message. A second exemplary embodiment of transmitting a user ID includes transmitting a media access control address (MAC address) during a wireless transmission via any of the WLAN, WPAN or NFC transmission protocols. A third exemplary embodiment of transmitting a user ID includes transmitting a portion of stored user profile information from the mobile devices 10 or 32. In this instance, the user may have the option as to which specific user information from the mobile device is transmitted, if any at all, for security purposes.

Figure 7B:
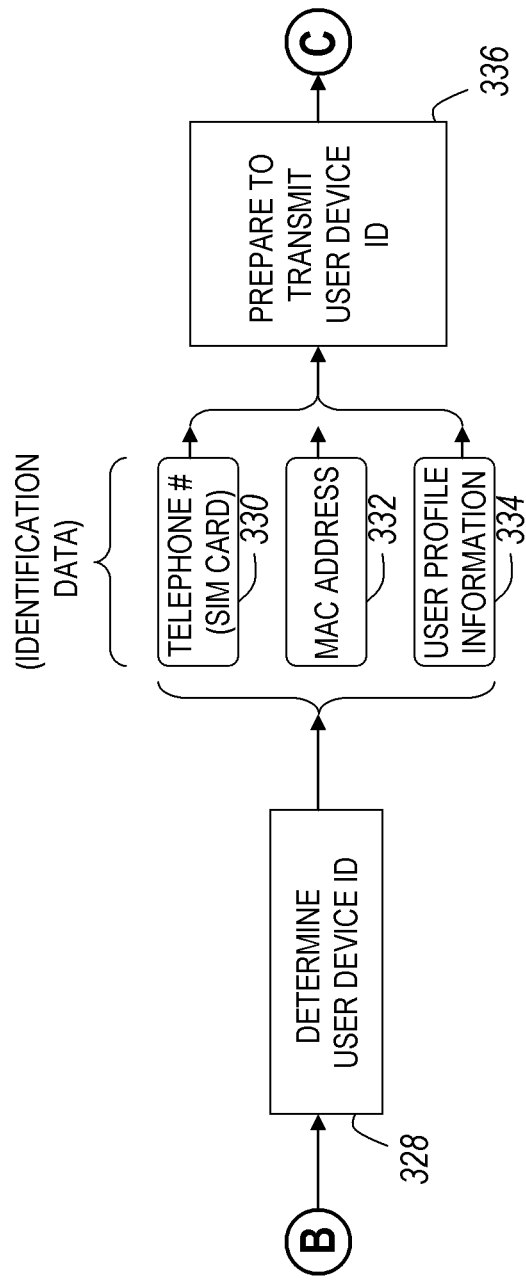
FIG. 7B illustrates a continuation of the a logic flowchart of FIG. 7A of the pervasive symbiotic advertising system, according to an exemplary aspect of the user initiated response to an ad prompt by the ad service of the present invention.

FIG. 7B illustrates the determination of a user device ID (328) for transmission in the user response to the ad service. There are three types of identification data that may be used: the telephone number (330), a MAC address (322), or user profile information (334). After determining which user device ID is necessary to be transmitted, the mobile device then prepares to transmit this user device ID in its user response (336).

The ad presentation ID, as previously described above, may be transmitted either manually or automatically in the user response to the ad service 4 or 22.

In the first manual exemplary embodiment, an ad presentation ID may be displayed in a video presentation or output in an audio presentation as the combination of numbers or characters and subsequently entered by the user on the keypad of the mobile device 10 or 32 for transmission to the ad service 4 or 22 via a cellular network in a SMS text message or a normal cell phone call.

Additionally, and a second manual exemplary embodiment, if a mobile device is equipped with a camera, a picture taken of the ad presentation by the user may be transmitted via any communication protocol to the user response receiver 18 or 36 to ad service 4 or 22, respectively.

Finally, in a third manual exemplary embodiment, for certain ad presentations, an ad presentation time may be entered on the mobile device to be transmitted to the ad service wherein the ad service will determine which specific ad presentation was being presented at the time specified in the transmitted user response. This embodiment may be beneficial for a user who saw or heard an ad presentation but responded at the time much later than the original ad presentation. The user would then be able to respond by inputting the time proximate the ad presentation earlier in the day.

A first automatic exemplary embodiment of transmitting an ad presentation ID to ad service 4 or 22 may merely include time of transmission by the mobile device 10 with 32, or a time of receipt of the user response at ad service 4 or 22. These times, when analyzed by the ad service 4 or 22 may provide sufficient information to determine what specific ad presentation a user is responding to. However, in this situation a user must respond to an ad presentation output by the ad service at or near the time of the actual ad presentation for the ad service to make a corrected termination.

An alternative embodiment of the above first automatic exemplary embodiment of transmitting an ad presentation ID to ad service 4 or 22 may further include transmitting a user input location to determine the presentation location of the ad presentation in addition to the time of transmission. This option will free the user from having to respond to the ad presentation at the presentation location and allow the user to respond to the ad presentation outside of the presentation location.

The second automatic exemplary embodiment may include the ad presentation ID code transmitted by the ad presentation ID transmitter 16 as received and stored in the mobile device 10 been retransmitted back view the user response receiver 18 to the ad service 4 after a user has selected the particular ad presentation ID on the mobile device 10. This ad presentation ID may be either a static or dynamic ID code as described above, and may include an alpha-numeric code or a graphic thumbnail.

Figure 7C:
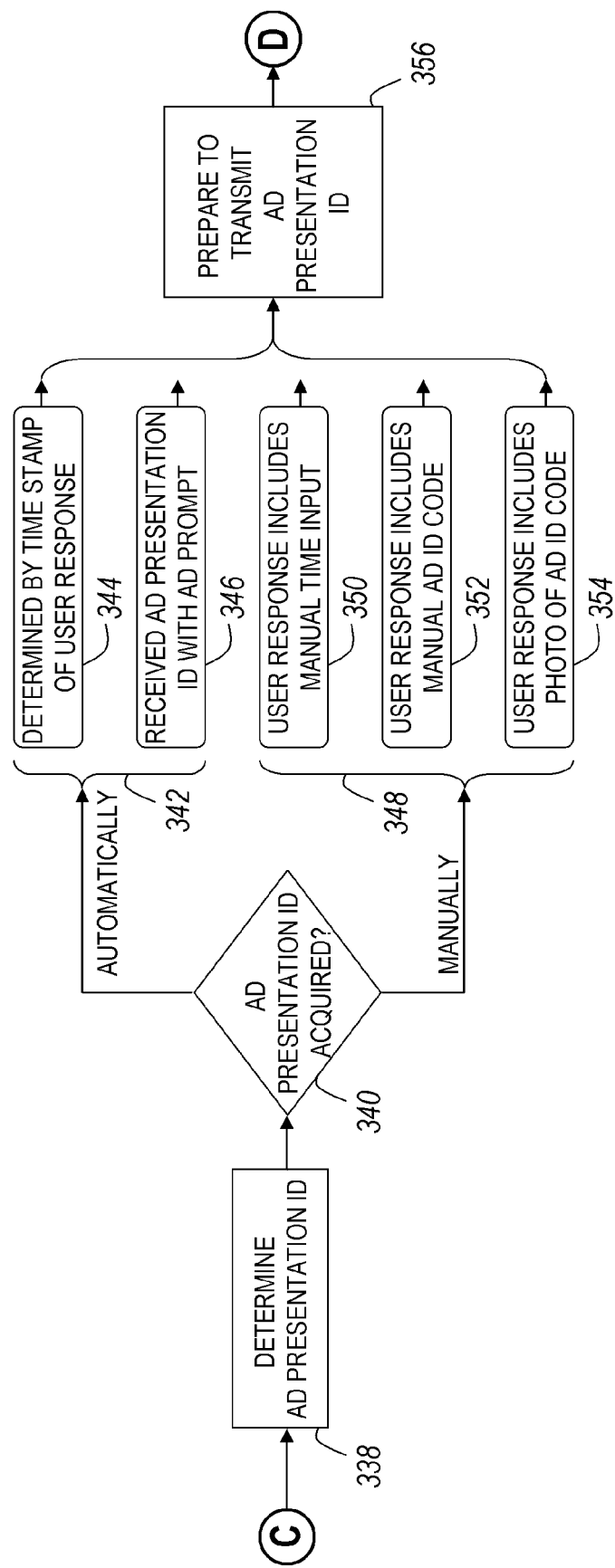
FIG. 7C illustrates a continuation of the a logic flowchart of FIG. 7B of the pervasive symbiotic advertising system, according to an exemplary aspect of the user initiated response to an ad prompt by the ad service of the present invention.

FIG. 7C illustrates the determination of an ad presentation ID (338) for transmission in a user response to the ad service. First, it is determined how the ad presentation ID is acquired (340). If it is acquired automatically (342), then the ad presentation ID may be determined by the time stamp of the user response (344), or the ad presentation ID that is received with the wireless ad prompt via the ad presentation ID transmitter 16 has shown in FIG. 1.

If the ad presentation ID is manually entered (348), then the ad presentation ID may be determined by a user input a time of the ad presentation (350), the user input of an ID code displayed or output in the ad presentation (352), or a photo taken by the user on the mobile device of the ad ID code (354). After determining which ad presentation ID is necessary to be transmitted, the mobile device then prepares to transmit this ad presentation ID in its user response (356).

Finally, the target device ID is specified by the user of either mobile device 10 or 32 that specifies the target communication device for receiving a service transmitted by the ad service 4 or 22. The target device may be the user's own mobile communication device, wherein the responding mobile communication device is the same as the target device ID, or it may be a third party device, wherein the responding mobile communication device is different from the target device ID. A third party device specified as a target device may include another mobile communication device or a networked computing device.

The target device ID input by a user may be a telephone number, an e-mail address or any other ID code to enable the ad service to identify the target device as a transmission target for a service. However, the user may or may not have of the option to specify a target device since the ad service controls the functionality of transmitting a service to a third party device. In this instance, the target device ID may be automatically input in the user response as the SIM code, MAC address or other user profile information, as described above.

Figure 7D:
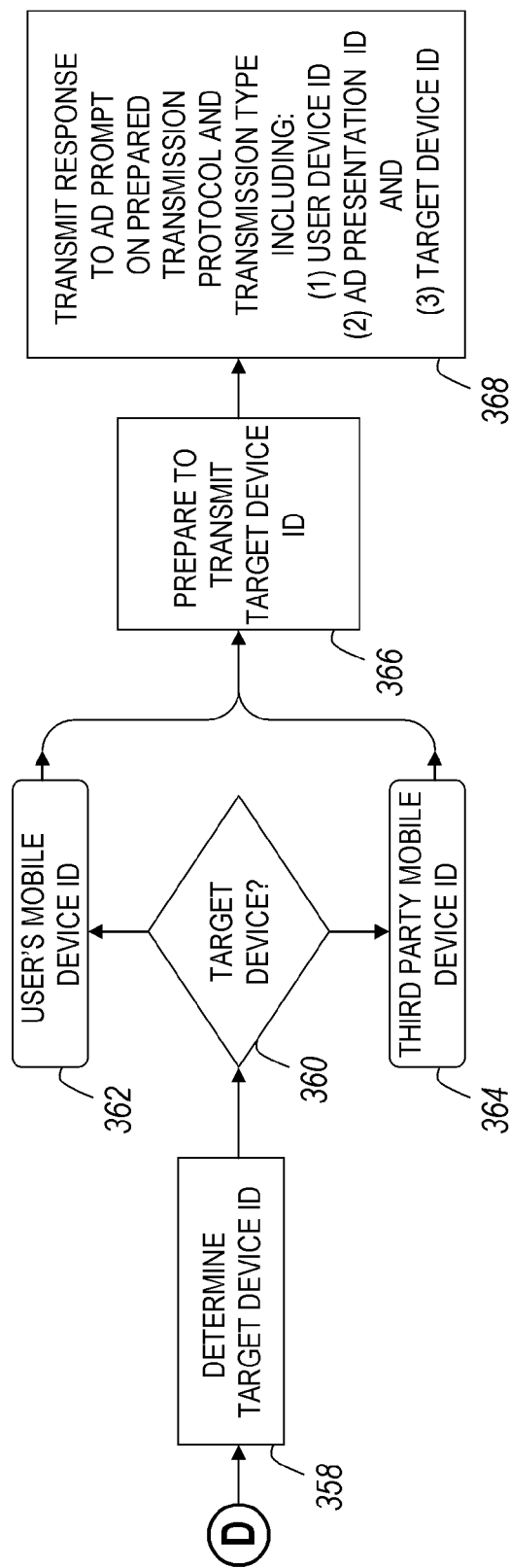
FIG. 7D illustrates a continuation of the a logic flowchart of FIG. 7C of the pervasive symbiotic advertising system, according to an exemplary aspect of the user initiated response to an ad prompt by the ad service of the present invention.

FIG. 7D illustrates the determination of the target device ID (358) as input by the user on the mobile device for transmission to the ad service. First, the inquiry is made as to whether the target device is the user's mobile device ID (362) or is a third party mobile device ID (364). After determining which target device ID is necessary to be transmitted to the ad service, the mobile device then prepares to transmit this target device ID in its user response (366).

The user response that is then transmitted to the ad service based on the determined transmission protocol in the determined transmission type, including the determined the user device ID, ad presentation ID and a target device ID (368).

Generation of an Executable Object

Once the user response is received either the ad service 4 or 22, the ad service generates an executable object based on the above-described content of the user response, that is, either the transmission protocol used to respond to the ad presentation or ad prompt, the user ID, the ad presentation ID, the target device ID, or any or all combinations of these. In this way, the executable object may be customized with any of this information before it is transmitted to the target device.

In the alternative, the ad service may generate the executable object and embed the executable object with the ad presentation before the ad is presented on the ad presentation output device. This embodiment may allow for remote distribution of the executable object on the ad presentation output device at the ad presentation location rather than the executable object coming from a location remote from the presentation location.

Additionally, ad transaction data may be included in the executable object for subsequent data collection and analysis by the ad service. This included information may include the presentation location, presentation output device, the time of the ad presentation, the ad presentation ID, the location of the user response with respect to the presentation location, the transmission protocol and type of user response received, and any user profile information collected during the pre-user response from the mobile device.

Transmission of the Executable Object Via a Transmitter

The ad service 4 or 22 transmits the generated executable object via ad service transmitter 20 or 38, respectively to the specified target device. Ad service transmitter 20 communicates to mobile device 10 via any of the wireless communication zone 12 protocols as described above. Ad service transmitter 38 communicates to mobile device 32, outside of the wireless communication zone 12 via a cellular network 34. Reference number 38 designates the ad service transmitter being outside of the wireless communication zone 12 although it is identical to the ad service transmitter 20 within the wireless communication zone 12. Additionally, ad presentation ID transmitter 16 and ad service transmitter 20 within the wireless communication zone 12 May be the same transmitter and use the same communication protocols.

Ad service transmitter 38 may transmit the executable object via cellular network 34 to the mobile device 10 within the wireless communication zoned 12, mobile device 32 outside of the wireless communication zone 12, or a third party mobile device 40, wherein each of these devices has been designated as the target device.

Additionally, the ad service transmitter 38 may transmit the executable object through a data network 42 to a networked computer 44 being identified as the target device in the user response.

The executable object is received via the above described methods and protocols, is stored in a memory of the target device, and executed by a processor on the target device.

When the executable object is executed on the processor of target device that provides a service to the user of the target device in the form of a coupon, a direction finding service, a data providing service, functions within the executable program itself, or any other function that provides a benefits two of the user of the target device while at the same time continuing to solicit a transaction for goods or services advertised by the ad service in the ad presentation.

The service provided on the target device includes a unique service ID that may identify the entire ad transaction from the original ad presentation to subsequent purchase of any goods or services. This unique service ID may be used by the ad service to collect information on the patterns, habits and purchases of the user. This unique service ID code may be transmitted to the ad service upon the purchase of goods and services at the point of sale (POS) or in an on-line transaction.

This service provided on the target device by executing the executable object, may be transmitted from the target device to another secondary target device wherein other user may benefit from the transmitted service and may purchase goods or services associated with the service. The secondary target device may be another user mobile device or a networked computing device.

Modifying a Provided Service

The service provided on the target device by executing the executable object, may include user specific information from the previous user response, as described above, and may be further modified by information relevant and local to the target device.

A first exemplary embodiment of the modification process includes using stored user profile information on the target device. The stored user profile information may be automatically accessed by the execution of the executable object, or may be transmitted with the executable object to the target device from the previous user response to the ad prompt. The user may have control over what specific information that the executable object uses from the user profile information.

An alternative embodiment of the above first exemplary embodiment of using user profile information may include processing user profile information stored in a remote location, not on the user's mobile device, that is retrieved by said ad service based on information transmitted in said response by said mobile device. An example of this may include a user profile ID code to a remote service either being transmitted to the ad service in the user response to the ad prompt, or being retrieved from the mobile device by the operation of the executable object obtaining the user profile ID code included in the user profile information on the mobile device. Once this user profile ID code is accessed, either the ad service or the executable object may retrieve user profile information from the remote service based on the user profile ID code. The user profile ID code may be a logon ID that is input into a remote web-based on-line service to retrieve public or private user profile information accessible by the ad service or the executable object.

Figure 8A:
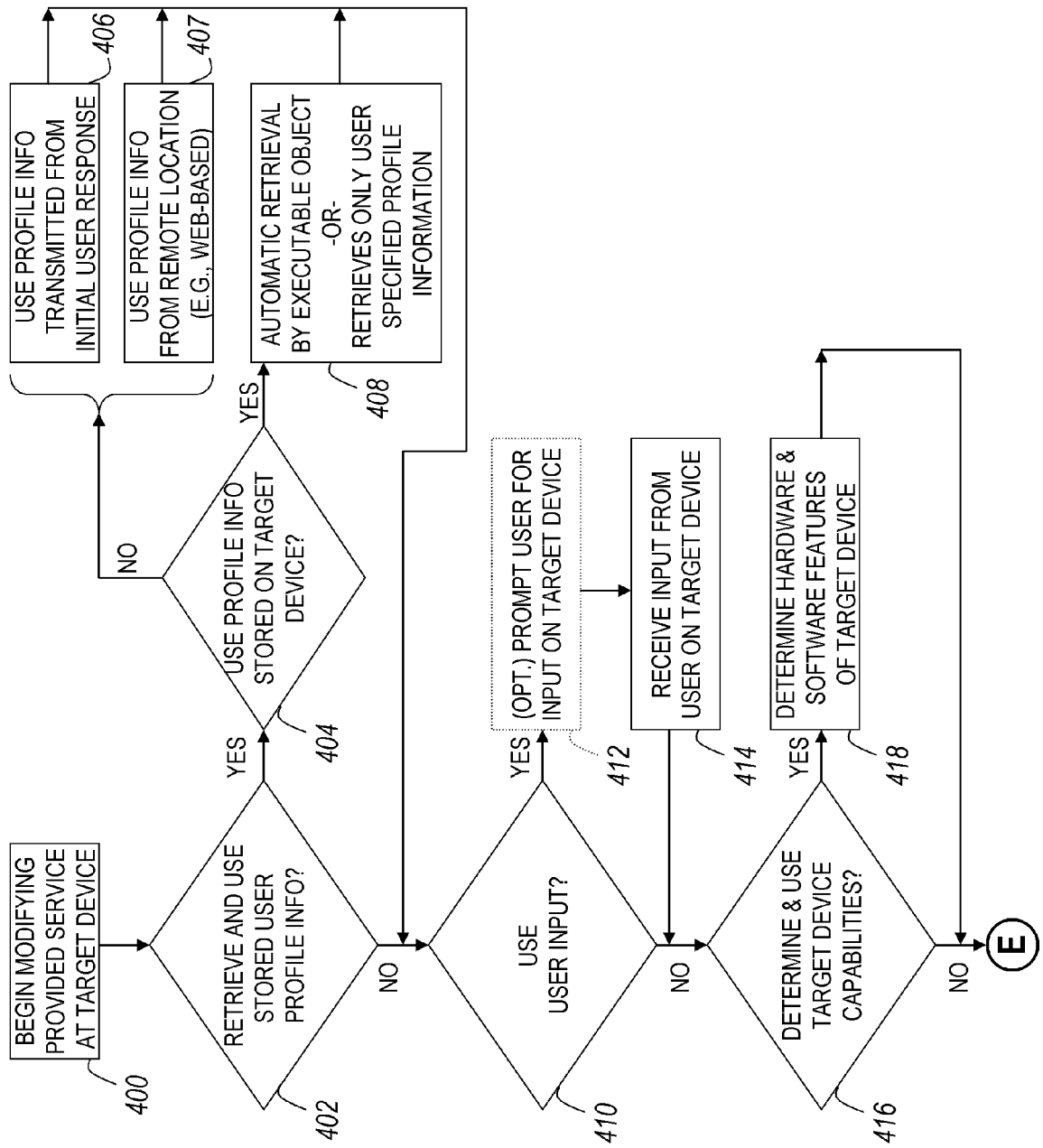
FIG. 8A illustrates a logic flowchart of the pervasive symbiotic advertising system, according to an exemplary aspect of the modification of a provided service at a target device of the present invention.

FIG. 8A illustrates a process of modifying a provided service at a target device (400). The first determination is made whether to retrieve and use user profile information on the target device (402). The determination is then made whether to use profile information stored on the target device (404). If no stored user profile information as to be used, then it may use profile information transmitted from the initial user response (406). In the alternative, user profile information may be retrieved from a remote location (407) based on a user profile ID code allowing either the ad service or the executable object to retrieve user profile information based on information of a user account accessed by the user profile ID code. Otherwise, stored profile information is used by automatic retrieval by the executable object or retrieval of only user-specified profile information (408).

A second exemplary embodiment of the modification process includes user input on the target device in response to the executable object generated service. This may include queries that the user response to as a result of the service, or information input in the target device over a period of time that is collected by the executable object generated service.

FIG. 8A further illustrates where the executable object uses any user input (410) and optionally prompts the user. The executable object optionally prompts a user for input on the target device (412) and then receives input from the user on the target device (414). As mentioned above, the user input may also be collected by the executable object without specifically prompting the user, effectively bypassing prompting the user for input on the target device (412) and only receiving input from the user on the target device (414).

A third exemplary embodiment of the modification process includes determining what specific hardware and software capabilities exist on the target device. For example, an NFC reader, (RF ID reader), memory capacity, display parameters, global positioning system (GPS), specific device drivers, etc. In this way, the service may be modified based on the capabilities of target device.

FIG. 8A further illustrates whether the executable object determines the target device capabilities and uses the target device capabilities (416). The executable object then determines what hardware and software features are included on the target device (418).

A fourth exemplary embodiment of the modification process includes determining if any hardware is connected to the target device such as a printer, monitor, external GPS unit, or the like. In this way, the service may be modified based on any hardware connected to the target device.

Figure 8B:
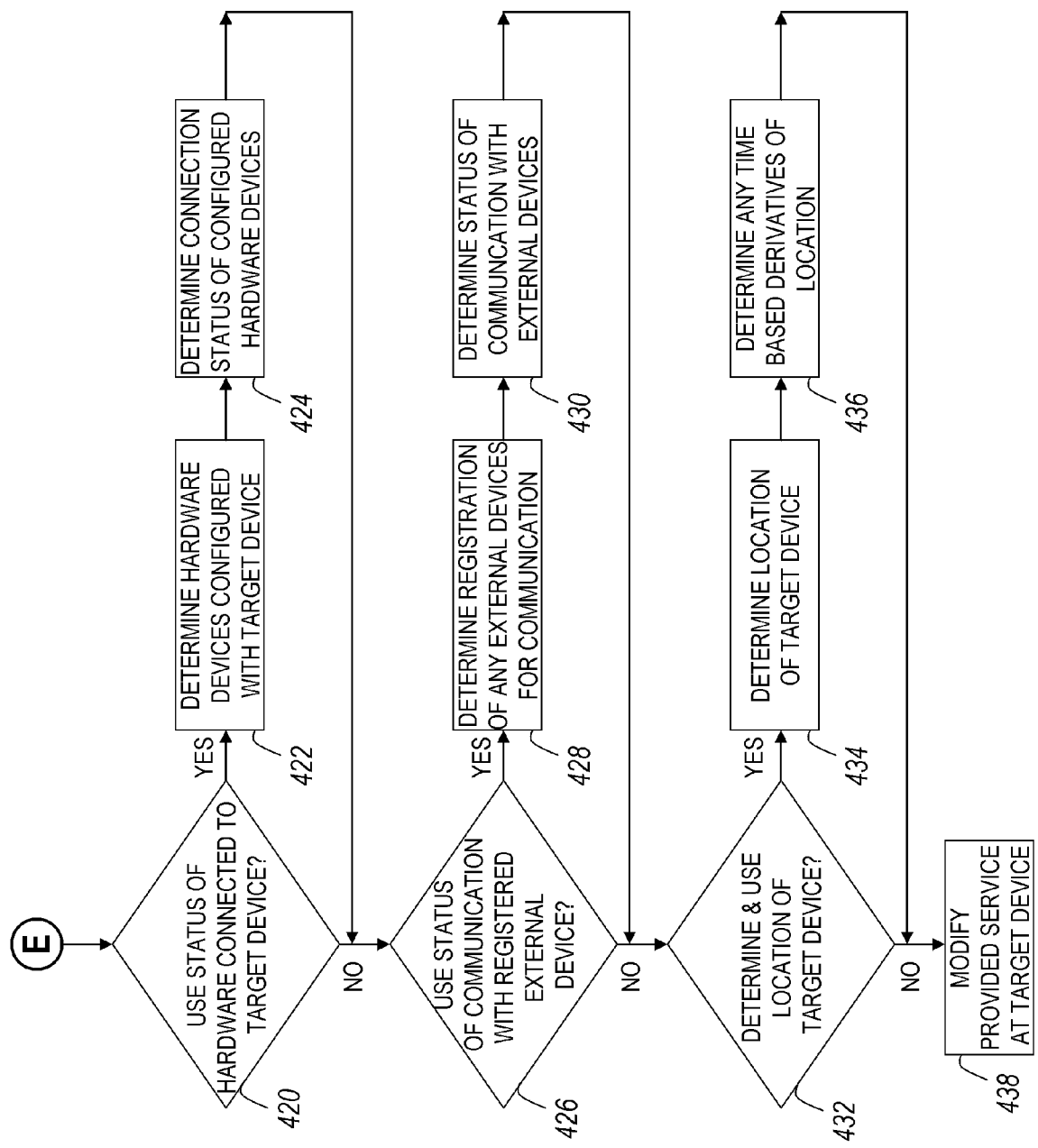
FIG. 8B illustrates a continuation of the logic flowchart of FIG. 8A of the pervasive symbiotic advertising system, according to an exemplary aspect of the modification of a provided service at a target device of the present invention.

FIG. 8B illustrates the executable object determining to use the status of hardware connected to the target device (420). The executable object determines the hardware device is configured with the target device (422), and then determines the connection status of those configured hardware devices (424).

The fifth exemplary embodiment of the modification process includes determining if any external device is registered for communication with the target device and a communication status of such registered devices with the target device. This may include, for example, WLAN devices such as wireless routers, WPAN devices such as Bluetooth devices, NFC devices such as RF ID chips. In this way, the service may be modified based on any devices registered with the target device, or the communication status of registered devices with the target device.

FIG. 8B further illustrates the executable object determining determined to use the status of communication with a registered external device (426). The executable object determines if there are any external device is registered for communication with the target device (428). Then the executable object determines the status of communication of the registered external devices with the target device (430).

A sixth exemplary embodiment of the modification process includes determining the location of the target device by global positioning system (GPS) or any other location detecting device. Additionally, position derivatives such as velocity, acceleration, accumulated distance, or the like may be used to modify the service. In this way, the service may be modified based in any particular location with location derivative parameter of the target device.

FIG. 8B further illustrates the executable object determining and using the location of the target device (432). The executable object determines the location of the target device (434), and determines if there any time based derivatives based on the determined location (436).

The executable object then provides a modified service at the target device (438) based on any one or combination of the above described modification parameters.

Additionally, the modified service may also include a unique modified service ID code that identifies the entire ad transaction from the ad presentation through the modification of the service to purchase of goods or services based on a service provided two the target device. This unique modified service ID code may be transmitted to the ad service upon the purchase of goods and services at a point of sale (POS) or in an online transaction.

This modified service provided on the target device by executing the executable object, may be transmitted from the target device to another secondary target device wherein other user may benefit from the transmitted modified service and may purchase goods or services associated with the modified service. The secondary target device may be another user mobile device or a networked computing device. However, if the primary modification of the service is based on user profile information of the target device, transmitting a specific modified service to another user may not be as relevant to the user of the secondary target device as would transmitting a modified service based on non-user profile information of the target device.

A user after receiving the service or the modified service or a user having received the transmitted service or the transmitted modified service may then purchase goods or services relevant to the specific service received.

Additionally, the service may continue past the time of the original purchase of goods or services, offering additional services to the user, and soliciting a user to make subsequent purchases. An example would be if a user purchased software using the original service, wherein the original service now notifies the user of new versions, add-ons to the original software or discounts on related software products and services.

The ad transaction ID, service code ID and modified service called ID may be transmitted to the ad service and the purchase of goods are services in response to the service. This data, as mentioned above, may be compiled and analyzed by the ad service to determine the efficacy of a particular ad presentation strategy. This information may be collected at the point of sale (POS), from on-line transactions, or any other place or means where data may be collected.

An alternative embodiment of the executable object modified a provided service with information pertaining to the target device may include modifying the provided service based on parameters and conditions independent of the target device but still relevant to the user of the target device, for example, a local weather condition.

An executable object may be transmitted with embedded information about a weather condition at the location of the target device. Alternatively, the executable object may determine the location of the target device when first executed on the target device via a GPS system, and may then retrieve real-time weather data about a forecast at that determined location.

For example, the executable object may determine that it is raining at the location of the target device by the above two examples or any other equivalent method. The ad service may act on a behavioral model that suggests buyers are more likely to stop in a coffee shop to purchase coffee when it is raining. Under a condition where it is not determined to be raining, the executable object may normally provide a coupon for a specific coffee shop at a "standard" discount based on at least one of the many factors previously discussed. However, the additional condition distinct from information on the target device, i.e., it is raining where the target device is, may be used by the executable object to modify the standard discount and create a new coupon with a reduced discount given the behavioral model that the coffee shop will likely have increased sales during periods of rainy weather. Therefore, the vendor will increase their revenue by modifying the provided service at a time when conditions may not be favorable to issue a "standard" discount coupon.

This above example shows the limitless modifications of the final provided service at the target device based on parameters used by the executable object determined before the ad is presented, after the ad is presented and responded to by the user on their mobile device, information on or concerning the target device, and information external to but relevant to the target device.

Figure 6A:
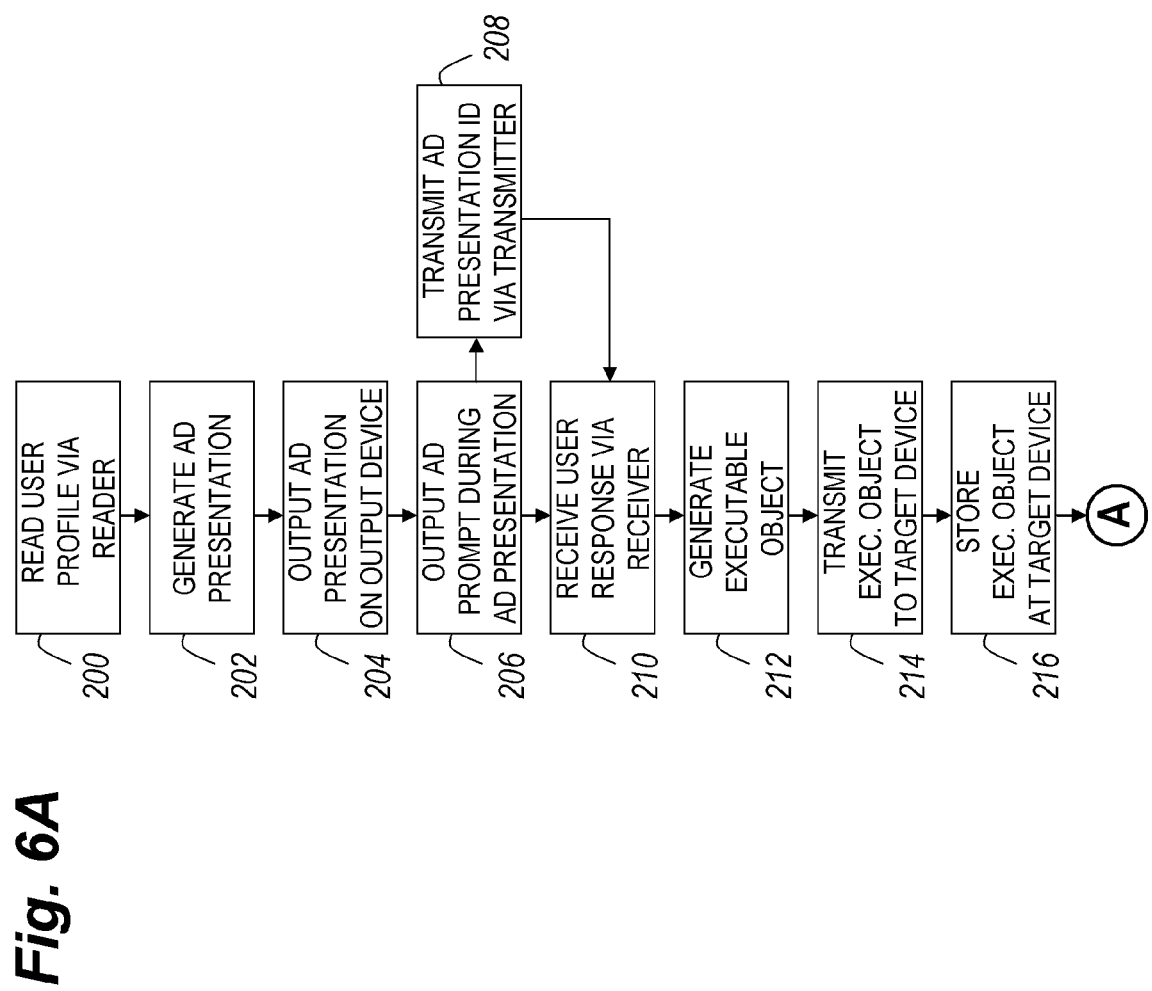
FIG. 6A illustrates a logic flowchart of the pervasive symbiotic advertising system, according to an exemplary aspect of the present invention.
Figure 6B:
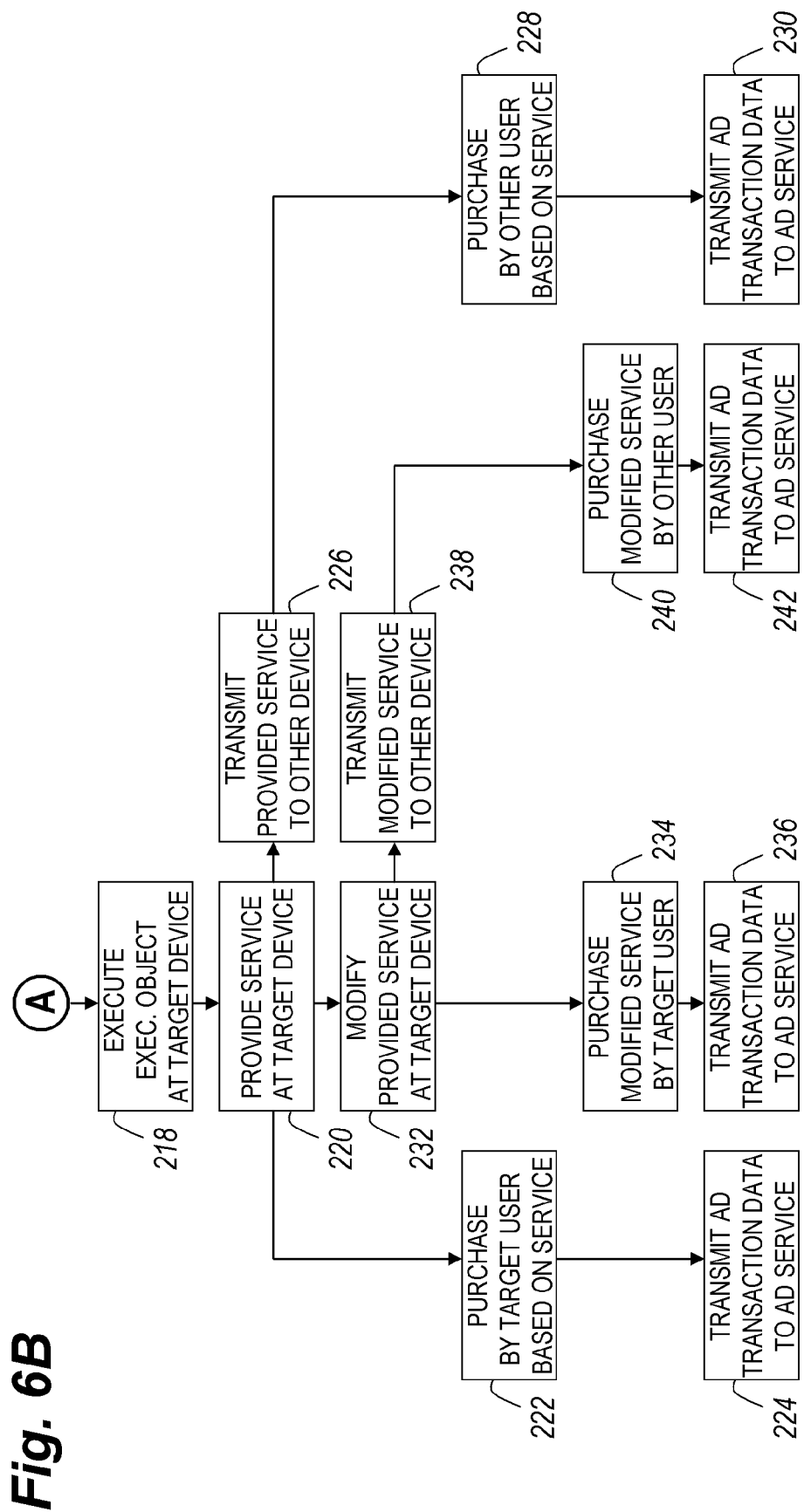
FIG. 6B illustrates a continuation of the logic flowchart of FIG. 6A, of the pervasive symbiotic advertising system, according to an exemplary aspect of the present invention.

FIGS. 6A-6B illustrate the logic flowchart of the general method by which the present invention operates.

First, when a mobile device 10 enters into the wireless communication zone 12 of the presentation location 2, the user profile reader 14 reads the user profile information from the mobile device (200).

This user profile information transmitted to ad service 4 generates an ad presentation (202) based on the user profile, and outputs an ad presentation (204) to either an ad presentation video output device 6 or audio output device 8.

During the ad presentation, an ad prompt is output (206) to prompt the user to respond via his mobile device 10 or 32. Concurrently with the ad prompt, in ad presentation ID may be transmitted (208) via an ad presentation ID transmitter 16. This ad presentation ID allows a user on the mobile device 10 to easily select an ad presentation to respond to if more than one ad presentation is occurring.

A user response made on mobile device 10 or 32 is received (210) via a user response receiver 18 or 36, respectively. The ad service 4 or 22 generates an executable object (212) and transmits the executable object (214) to a target device specified in the user response.

The transmitted object is stored at the target device (216), and is executed by a processor at the target device (218) to provide a service to the user at the target device (220). The user of the target device may then purchase goods or services based on the provided service (222), and ad transaction data related to the provided service is transmitted to the ad service (224).

The provided service may be transmitted to another device (226), wherein the other user may purchase goods are services based on the transmitted service (228), and ad transaction data related to the transmitted service is transmitted to the ad service (230).

The executable object at the target device may modify the provided service (232), wherein a user of the target device may then purchase goods are services based on the modified service (234), and ad transaction data related to the modified service is transmitted to the ad service (236).

The modified service may be transmitted to another device (238), wherein the other user may purchase goods are services based on the transmitted modified service (240), and ad transaction data related to the transmitted modified service is transmitted to the ad service (242).

With its unique and novel features, the present invention provides a system and method for moving an ad components from one device to another, storing the ad, and having the ad be modified into other forms in a way that is customized to the user and the environment where the ad is hosted.

While the invention has been described in terms of one or more exemplary embodiments, those skilled in the art will recognize that the invention may be practiced with modification within the spirit and scope of the appended claims. Specifically, one of ordinary skill in the art will understand that the drawings herein are meant to be illustrative, and the design of the inventive assembly is not limited to that disclosed herein but may be modified within the spirit and scope of the present invention.

Further, Applicant's intent is to encompass the equivalents of all claim elements, and no amendment to any claim the present application should be construed as a disclaimer of any interest in or right to an equivalent of any element or feature of the amended claim.

What is claimed is:

1. An advertising system, comprising:
a response receiver configured to receive a response from a mobile user device to an ad presentation, said response comprising user information and an ad identifier; and
an ad service transmitter that transmits an executable object to said mobile user device, said executable object providing a service on said mobile user device that is modified by said user information,
wherein said mobile user device includes a memory and a processor for executing said executable object to provide said service on said mobile user device,
wherein said service comprises an executable object configured to complete a user's purchase of goods and services in an online transaction,
wherein said service further comprises a modified service ID code to identify an entire ad transaction through the modification of the service to complete purchasing goods or services based on the service, and
wherein said modified service ID code is transmitted to the ad service transmitted upon the user's purchase of goods and services.

2. The advertising system according to claim 1, further comprising an ad presentation output device to output said ad presentation, said ad presentation output device comprising one of a video output device and an audio output device.

3. The advertising system according to claim 1, wherein said ad identifier includes an ad presentation ID that the mobile user device includes in said response.

4. The advertising system according to claim 3, wherein said ad presentation ID code is wirelessly transmitted via an ad presentation ID transmitter to said mobile user device and includes one of an ID code and an ad graphic that identifies a specific ad presentation to said mobile device.

5. The advertising system according to claim 1, wherein said response is transmitted by one of:
a wireless local area network protocol;
a wireless personal area network protocol; and
a near field communication protocol.

6. The advertising system according to claim 1, wherein said response is transmitted via a cellular communication network in one of a telephone call and a short message service (SMS).

7. The advertising system according to claim 1, wherein said mobile user device comprises one of said mobile user device, another mobile user device, and a computer connected to a network.

8. The advertising system according to claim 1, wherein said user information comprises at least one of:
user profile information one of stored on said mobile user device and transmitted in said response by said mobile user device;
user profile information one of stored in a remote location and retrieved from said remote location based on information one of stored in said mobile user device and transmitted in said response by said mobile user device; and
a user input on said mobile user device given in response to executing said executable object.

9. The advertising system according to claim 1, wherein said service further comprises:
a coupon to be used in purchasing one of goods and services;
an executable program;
one of a location finding and a direction providing service; and
a connection to and use of a data providing service.

10. The advertising system according to claim 1, wherein said service is further modified based on at least one of:
one of hardware and software capabilities of said mobile user device;
external hardware connected to said mobile user device;
an external device registered for communication with said mobile user device;
a status of communication of said external device with said mobile user device; and
a determined location of said mobile user device.

11. The advertising system according to claim 1, wherein said executable code is customized for a specific user.

12. A method of operating an advertising system, said method comprising:
- receiving a response to an ad presentation from a mobile user device, wherein said response comprises user information and an ad identifier;
- generating an executable object based on said received said ad identifier, wherein said executable object provides a service on said mobile user device that is modified by said user information; and
- transmitting said executable object to said mobile user device to provide said service,
- wherein said service comprises an executable object configured to complete a user's purchase of goods and services in an online transaction,
- wherein said service further comprises a modified service ID code to identify an entire ad transaction through the modification of the service to complete purchasing goods or services based on the service, and
- wherein said modified service ID code is transmitted to the ad service transmitted upon the user's purchase of goods and services.

13. The method of operating an advertising system according to claim 12, further comprising modifying said provided service, said modifying comprising at least one of:
- retrieving user profile information one of stored on said mobile user device and transmitted in said response by said mobile user device;
- retrieving user profile information stored in a remote location based on information one of stored in said mobile user device and transmitted in said response by said mobile user device; and
- receiving an input on said mobile user device by a user in response to executing said executable object.

14. The method of operating an advertising system according to claim 13, further comprising:
- transmitting said modified service from said mobile user device to one of another mobile user device and a networked computing device.

15. The method of operating an advertising system according to claim 12, further comprising outputting said ad presentation by outputting on one of a video output device and an audio output device at an ad presentation location.

16. The method of operating an advertising system according to claim 15, wherein said outputting said ad presentation further comprises outputting one of:
- a single ad presentation on a plurality of ad presentation output devices;
- a plurality of simultaneous ad presentations on a single ad presentation output device;
- a user specific ad presentation based on user profile information transmitted from said mobile user device; and
- an ad presentation ID that identifies a specific ad presentation.

17. The method of operating an advertising system according to claim 12, further comprising:
- transmitting said provided service from said mobile user device to one of another mobile user device and a networked computing device.

18. The method of operating an advertising system according to claim 12, wherein service further comprises a coupon datum containing specific terms and time frames in which a purchase of an advertised product results in a price discount.

19. The method of operating an advertising system according to claim 12, wherein service further comprises a direction finding service that assists a user in finding locations or sources for the advertised product.

20. The method of operating an advertising system according to claim 12, wherein service further comprises transmitting data related to a user's purchase of goods and services to completing a point of sale (POS) transaction.

21. A method of operating an advertising system, said method comprising:
- receiving a response from a target device based on an ad presentation at a presentation location, said response comprising user information and an ad identifier;
- generating and transmitting an executable object to the target device; and
- providing a service to said target device by executing said executable object on a processor at said target device,
- wherein said service provided to said user is provided based on said user information and at least one of:
  - data regarding said target device;
  - an input received on said target device;
  - a hardware configuration of said target device;
  - a software configuration of said target device;
  - a communication device registered with and a status of communication with said target device; and
  - a determined location of said target device,
- wherein said service comprises an executable object configured to complete a user's purchase of goods and services,
- wherein said service further comprises a modified service ID code to identify an entire ad transaction through the modification of the service to complete purchasing goods or services based on the service, and
- wherein said modified service ID code is transmitted to the ad service transmitted upon the user's purchase of goods and services.

22. The method of operating an advertising system according to claim 21, further comprising:
- receiving ad transaction data when a transaction is made via said target device as a result of said provided service.

23. The method of operating an advertising system according to claim 21, wherein said providing said service to said user further comprises:
- modifying said provided service based on information received from said target device before receiving said response.

24. The method of operating an advertising system according to claim 21, wherein said providing said service to said target device further comprises:
- modifying said provided service based on information received in said response from said target device.

25. The method of operating an advertising system according to claim 21, wherein said providing said service further comprises:
- modifying said provided service based on information on said target device.

26. The method of operating an advertising system according to claim 21, wherein said providing said service further comprises:
- modifying said provided service based on receiving information regarding said target device.

27. A non-transitory computer-readable storage medium tangibly embodying a program of machine-readable instructions executable by a digital processing apparatus to perform operations supporting a method of operating an advertising system, the operations comprising:
- receiving a response from a target device based on said ad presentation;

generating and transmitting an executable object to said mobile device specified in said response;

providing a service to said target device by executing said executable object on a processor at said target device; and modifying said service on said target device based on user information and ad information accessed and determined by said executable object on said target device, wherein said service comprises an executable object configured to complete a user's purchase of goods and services, wherein said service further comprises a modified service ID code to identify an entire ad transaction through the modification of the service to complete purchasing goods or services based on the service, and wherein said modified service ID code is transmitted to the ad service transmitted upon the user's purchase of goods and services.

* * * * *